2,770,623

THIAMINE HYDROCHLORIDE (VITAMIN B₁)

Robert Louis Horton, Bound Brook, N. J., assignor to American Cyanamid Company, New York, N. Y., a corporation of Maine No Drawing. Application October 11, 1955,
Serial No. 539,916

2 Claims. (Cl. 260—256.6)

This invention relates to an improved method of recovering thiamine hydrochloride.

Thiamine hydrochloride, also known as Vitamin B₁, is produced synthetically on a very large scale. Two factors are of paramount importance in a practical operating process. First, the yields of the isolating step must be very high because even a small loss of yield amounting to only a few percent represents a very serious cost factor because of the high unit cost of crude thiamine hydrochloride. Secondly, the process must consistently yield a uniform product having a high degree of purity. One of the best recently developed processes for preparing thiamine hydrochloride involves in its last reaction step the oxidation in acid medium of the N-(2'-methyl-4'-amino-pyrimidyl-5'-)-methyl - 4 - methyl-$\beta$-hydroxyethyl-thiothiazolone (2). The usual oxidizing agent is hydrogen peroxide which oxidizes the sulfur-hydryl group to sulfate. The sulfate is then removed with barium chloride, the aqueous solution reduced to a small volume by evaporation and the thiamine hydrochloride precipitated by means of ethanol. This product is described in Example 1A on column 5 of the patent to Matsukawa and Iwatsu, No. 2,592,930. It is with the last step of this process that the present invention deals and over which it constitutes a practical operating improvement. The Matsukawa and Iwatsu process is open to a serious disadvantage that it is very difficult to remove water reliably by distillation under reduced pressure and when extreme care is not taken, significant losses in yield result. In general, the average yield with ethanol is about 85%. While occasionally one or two percent higher yield is obtainable when by accident the moisture removal is exactly right, this cannot be relied upon, and sometimes the yields drop materially below 85%. It is also not possible to obtain a uniform purity as evidenced by color. Sometimes the color is excellent and sometimes it is poor. The uncertainty of result in practical commercial operation constitutes a very serious drawback.

The present invention is based on the use of a particular high-boiling alcohol to remove moisture azeotropically. This alcohol is ethoxy ethanol. It is possible to obtain reliable yields averaging 5% greater than those with ethanol. The use of a high-boiling alcohol for removing moisture, azeotropic distillation, is not new, but the unique feature of the present invention is that ordinary alcohols cannot be used, thus for example butanol, the most common high-boiling alcohol used for dehydration and butoxy ethanol, precipitate thiamine hydrochloride in a form in which it cannot be effectively washed and purified on a practical scale. The solubility of thiamine chloride in other allied alcohols such as methoxy ethanol and diethylene glycol is more than four times as great as in $\beta$-ethoxy ethanol and makes the high yields obtainable therewith theoretically impossible. It is not known why $\beta$-ethoxy ethanol has the peculiar property of precipitating thiamine hydrochloride in a readily filterable and washable form and at the same time the product shows extraordinarily low solubility.

The degree of dehydration is another factor in which the present invention presents an important advantage. It is not necessary to dehydrate 100% as the solubility increases only slightly in the presence of water up to 10% by volume based on the $\beta$-ethoxy ethanol. When the solubilities are as follows, the measurements being at 22° C.

| Percent $\beta$-ethoxy Ethanol by Volume | Solubility, Grams per 100 cc. |
|---|---|
| 100 | 0.33 |
| 95 | 0.57 |
| 90 | 0.84 | above 10% moisture, however, solubility increases rapidly. Therefore the present invention should be operated to maintain a final moisture content of less than 10%.

The amount of $\beta$-ethoxy ethanol used is also not critical. However, it is, of course, undesirable to leave an excessive amount present when the solution concentration is complete as even with very low solubility there are substantial losses if the amount exceeds 15:1 based on the weight of the thiamine hydrochloride. Preferably less than this should be used.

The invention will be illustrated in greater detail in the following specific example, the parts being by weight unless otherwise specified. 118.4 parts of N-(2'-methyl-4'-aminopyrimidyl-5'-)-methyl - 4 - methyl-5-$\beta$-hydroxy-ethylthiothiazolone (2) are oxidized by the adding 124 parts of 35% hydrogen peroxide solution to a suspension of the material in 825 parts of water, 16.3 parts of concentrated hydrochloric acid, the temperature being maintained between 40–45° C. Excess hydrogen peroxide was destroyed by adding 32 parts of a 10% sulfurous acid solution. Thereupon 104 parts of barium chloride dihydrate and 25 parts of a siliceous filter aid and some decolorizing carbon were added and the solution filtered. The filter cake was then rinsed with 650 parts of water and the combined filtrate and washings were divided into two equal portions. The first half was concentrated to 135 parts by volume by evaporation under reduced pressure and 500 parts by volume of anhydrous ethanol was then added. The stirred slurry was cooled to 5° C. and the product filtered. The precipitate was then rinsed with 100 parts by volume of anhydrous ethanol and dried at 50° C. until free from alcohol. The yield was just under 83%, the average of several repeated runs being about 85% and the average color corresponding to 5 cc. of 0.1 N potassium dichromate solution diluted to 1 liter with water. Even in the laboratory the color varied from run to run from as much as 6 cc. to as little as 2 cc., the average being about 4 cc.

The second portion of the filtrate and washings were concentrated to about 180 parts by volume. The solution was then cooled to 40° C. and 250 parts of $\beta$-ethoxy ethanol added. The resulting mixture was distilled under reduced pressure, two additional portions of 150 parts of $\beta$-ethoxy ethanol being added. When 240 parts of distillate had accumulated, the slurry was cooled to 10° C. and the product filtered. The filter cake was rinsed with 225 parts of chilled anhydrous ethanol and dried at 50–60° C. A yield of approximately 90% was obtained and the material had a color in 10% solution corresponding to about 3.5 cc. of 0.1 N potassium dichromate solution diluted to a liter with water. In a number of runs the yield did not change significantly and the color remained the same.

The above example illustrates a preferred procedure of the present invention in which the water removal is stopped when the amount of water remaining is approximately 5% or slightly less. It is possible to remove all of the water, but the increase in yield would theoretically be insignificant and as a practical matter, if all of the water is removed, the crystal structure of the product is such that filtration and washing is very difficult and for practical commercial operations, undesirable.

The invention has been described in connection with sulfate-free aqueous solutions of thiamine hydrochloride prepared by the Matsukawa and Iwatsu process. The invention, however, is not limited to the treatment of aqueous solutions obtained by the said process and is generally applicable to any sulfate-free aqueous solution of thiamine hydrochloride.

This application is in part a continuation of my copending application 422,699, filed April 12, 1954, and now abandoned.

I claim:

1. A process of recovering thiamine hydrochloride from sulfate-free aqueous solution which comprises concentration at reduced pressure followed by azeotropic dehydration with β-ethoxy ethanol until the amount of water remaining is less than 10% by volume of the residual solvent and the amount of β-ethoxy ethanol remaining is less than 15 parts per part of thiamine hydrochloride but sufficient to maintain a filterable slurry.

2. A process according to claim 1 in which the amount of water remaining does not materially exceed 5%.

No references cited.